United States Patent [19]

Stockburger et al.

[11] 4,450,348
[45] May 22, 1984

[54] METHOD AND DEVICE FOR CHARACTERIZING AND IDENTIFYING FALSIFICATION PROOF DATA BOARDS

[76] Inventors: Hermann Stockburger, Kirnachweg 7, D-7742 St. Georgen; Hans-Georg Winderlich, Niedere Str. 36, D-7730 Villingen, both of Fed. Rep. of Germany

[21] Appl. No.: 414,645

[22] Filed: Sep. 3, 1982

Related U.S. Application Data

[63] Continuation of Ser. No. 221,547, Dec. 31, 1980, abandoned.

[30] Foreign Application Priority Data

Jan. 9, 1980 [DE] Fed. Rep. of Germany ....... 3000560

[51] Int. Cl.³ ............................................... G06K 5/00
[52] U.S. Cl. .................................. 235/380; 235/487; 235/493
[58] Field of Search ..................... 235/380, 487, 493; 340/825.34

[56] References Cited

U.S. PATENT DOCUMENTS 4,143,810 3/1979 Greenaway ..................... 235/487

Primary Examiner—Harold I. Pitts
Attorney, Agent, or Firm—Donald Brown

[57] ABSTRACT

The method of characterizing and identifying data supports such as value or identity cards in view of protection against falsification, imitation or duplication, comprises measurement of physical characterizing features of the data support and the measured characterizing values are converted into characterizing data recorded on the data support. The data supports are provided, at least in a zone of a reading track, with a surface pattern the lines, areas or dots of which differ from one data support to another by their widths and/or densities and/or respective associations. The surface pattern is read at selected positions of the reading track over limited paths or in punctual manner, and at least some selected reading results are used as said characterizing values.

4 Claims, 2 Drawing Figures

METHOD AND DEVICE FOR CHARACTERIZING AND IDENTIFYING FALSIFICATION PROOF DATA BOARDS

This is a continuation of application Ser. No. 221,547 filed Dec. 31, 1980 now abandoned.

BACKGROUND OF THE INVENTION

This invention generally relates to protection of data supports against falsification and duplication, particularly to a method of characterizing and identifying falsification-proof data supports, such as value or identity cards, in which physical characterizing features of the data support are measured and converted into characterizing data which are recorded on the data support, as well as a device for performing the method, and a data support which is suitable therefor. The invention also relates to a data support suitable for performing the method, and to an identification device for using the data support in view of performing the method.

Conventional automatically readable authorization cards or value cards are inserted into machines for distribution of wares or services, or identification of the person who is the owner of the respective card. For example, authorization cards may be used to allow access to an area or building. Value cards may be used as check cards to deliver money from an automatic money distributor. Examples of use of identity cards are automatically readable papers or passports.

With all kinds of use of those data supports it is important to avoid falsification or counterfeiting thereof, particularly also in cases where non-authorized persons get into possession of the primary data support material not yet provided with specific identification signs. Also, production of duplications by imitation of recorded data supports or cards must be rendered impossible to the falsifier.

In order to secure data supports, it is known to arrange a series of recording zones on the data support raw material and to record information therein. Upon use of the cards as data supports, this means that each non-recorded raw card contains a certain information in permanently recorded form, which information may e.g. be an identity number of the particular card. The card is further provided with a magnetic track for recording of a variable information. Recording of the magnetic track with the variable information is performed when the card is delivered to the authorized person. In case of an automatically readable check card, the variable information may e.g. be the account number of the owner, the date of delivery, the account status etc. In addition to the variable information, characterizing data are recorded on the magnetic track which correspond to the identification data of the respective raw or primary card. Upon each identification of the card in an automatic machine, the identification data of the raw card are detected and compared with characterizing data recorded on the magnetic track. The card is recognized as being authentic only in case of coincidence. This method has the advantage that non-authorized persons who are in possession of the raw card may not simply record some arbitrary data on such raw card in order that the machine may accept the card as being authentic. Rather, it is necessary that characterizing data are recorded on the magnetic track which correspond to the physical characterizing features of the respective raw card. As these characterizing features are different from one card to another, imitation of the cards is rendered difficult. However, the known method allows falsification by duplication, by providing the card raw material with the same physical characterizing features as those of an original card in possession of the falsifier. In this case, the information recorded on the magnetic track of the original card may be copied on the magnetic track of the falsified card without modification.

With the known cards considered as being falsification-proof, criteria of authenticity are symbols, markings, inside layers etc. applied on or within the card material. Further, it is possible to evaluate specific features of the card raw material which may be detected by measuring techniques, for example stampings, the thickness of layers, card size etc. All of these features may be detected by measuring techniques. They may be discovered and detected by falsifier. Because detectable markings are susceptible of analysing and analysed markings are susceptible of reproduction, the production of duplications is quite simple to a skilled falsifier, with the known methods.

OBJECTS OF THE INVENTION

It is a primary object of the invention to provide an improved method of protecting data supports against falsification and duplication.

It is a further object of the invention to provide a method of securing data supports rendering imitation, falsification or duplication practically impossible.

A still further object of the invention is to provide a data support adapted to be used with the method.

A still further object of the invention is to provide an identification device for use with those data supports and for performing the inventive method.

SUMMARY OF THE INVENTION

In accordance with the invention the data support is provided, at least in the zone of a reading track, with an automatically readable surface pattern the lines, areas or dots of which differ from one data support to another by their width and/or density and/or respective associations. The surface pattern is detected at selected positions along a path of limited length or in punctual manner, and at least some selected reading or detecting results are used as the physical characterizing features of the data support.

The invention is based on the idea that a surface pattern formed of many lines and areas, such as the background on bank-notes, documents or check cards, is analysed for identification of the respective data support. Patterns of this kind formed of superimposed lines and dashes which may have different colors are different from one data support to another, if considered in detail. Experimental investigations of bank-notes and Euro-check cards have revealed that, for example, the measurement of contrast at exactly defined positions of data supports, which should be strictly identical, have always different results. This is because, with the thin and closely spaced adjacent lines of a background pattern, line width and color density are different from one data support to another, just as the positions of the lines of the printed pattern on the data support. It has been found that it is practically impossible to print data supports with sufficient precision and uniformity to detect no differences upon accurate analysis of the data support by use of measuring techniques. Therefore, it is justified to state that any data supports such as bank-notes, check cards etc., upon accurate analysis, are different from one another, so that two identical data supports having identical background surface patterns will never exist. These differences of the background surface patterns are used by the invention, for identification or individual characterizing of the data support. Particularly in case of surface patterns of different colors, with the individual color components being applied by different printing operations, there will be minute differences with respect to the respective association of lines of different colors. Also, the positions of single color pattern lines with respect to the card ridge are different from one card to another. The same applies to line width which, if analysed at well-determined positions, differ from one card to another.

Thus, the invention uses the fact that modern measuring techniques allow measurement at precisely defined positions of a data support, the measuring results being reproducible with an accuracy which is much better than the accuracy that can be produced by the best known printing methods of printing patterns. For example, it has been tried to check whether bank-notes are genuine by measuring the contrast of their background pattern. However, these attempts have failed because of differences of the printing patterns among different items of bank-notes. The invention actually uses these differences, by converting individual features of the printing design or pattern into characterizing data which are additionally recorded on the data support. Thus, the recorded characterizing data represent an individual characterization of the respective printing pattern. Falsifiers who are in possession of the card raw material may try to transfer the characterizing data of an original data support to a raw or primary data support. Upon automatic identification of the imitated data support, however, this is immediately recognized as being falsified because its printing pattern is not identical with the printing pattern of the original data support with the required accuracy.

The surface pattern must not necessarily be a background pattern formed of many lines and dashes, rather the surface pattern may be any printed design of the card raw material. Further, the surface pattern must not necessarily be a visible printing pattern, rather, it may be a pattern of dielectric or magnetic lines et.

In order to avoid severe limitations of the measuring equipment with respect to measurement of the emitted energy density and sensitivity of the detectors, in accordance with an advantageous embodiment of the invention, during scanning or detection of a selected position along a limited path, the maximum and minimum value of the scanning or detection result may be averaged, and the quotient thereof is formed. Forming the quotient or ratio practically results in a contrast measurement along the limited measuring path. Along this measuring path, the contrast encountered is detected by detecting the brightest position and the darkest position and forming the quotient or ratio of the measurement values at those positions. By measuring this quotient or ratio, the influence of a light source, for example, the energy of which may change by aging or contamination, is avoided.

The numerical characterizing data generated in correspondence with the measured physical characterizing features may be recorded on an erasable information track. On the data support, a separate information track may be provided on which only the characterizing data, are recorded; however, in addition to the characterizing data, additional data may be recorded on the information track, for example the useful information.

In accordance with an advantageous embodiment of the invention, upon identification of the data support, the data support is recognized as being authentic in case the scanning or detecting results at a predetermined minimum number of detecting or scanning positions correspond with the respective characterizing data, and the characterizing data are re-recorded after each identification operation in accordance with the revealed characterizing features. With this method, the characterizing features of a limited number of measuring positions are allowed to differ from the recorded characterizing data. Such a difference may for example be caused by a card which is partially soiled or damaged. The characterizing data originally applied on the card and corresponding with the original surface pattern are re-recorded after an identification operation in case the card was still recognized as being authentic. This results in the card being refreshed in accordance with its actual degree of wear or contamination, so that any subsequent wear or contamination will not result into the refusal of the card upon the next identification operation.

The invention further relates to a data support for performing the above mentioned method. This data support is characterized by having, at least within the range of a reading track, an automatically readable surface pattern the lines or areas of which differ from one data support to another with respect to their widths and/or densities and/or respective associations. and that numerical characterizing data are recorded on an information track, the numerical characterizing data corresponding with the reading results at selected positions of the surface pattern.

A clock track may extend parallel to the reading track, the clock track having clock markings at the selected positions of the reading track. The reading track, for example, may be a magnetic track or an optically readable track. The clock markings define the position in space of the reading or scanning points.

An identification device for performing the inventive method is characterized in that a first reading head reading the reading track and a second reading head reading the clock track are provided, that the successive signals of the first reading head are separated under control of the clock signals of the second reading head, and that a third reading head is provided for introducing numerical data recorded on a protocol track into a register the content of which is compared in a comparator with signals derived from the first reading head, subsequent to the reading operations. During reading or scanning, the reading heads are moved in synchronism with respect to the data support. The signals of the second reading head define the positions and the length of the measuring intervals, whereas the measuring signals are generated by the first reading head in each measuring interval. The measuring signals are converted into characterizing data which are compared with the recorded characterizing data. The characterizing data are read by the third reading head.

In accordance with an advantageous embodiment, the first reading head is connected with a maximum value sample and hold circuit clock-controlled by the second reading head. and connected with a minimum value sample and hold circuit clock-controlled by the second reading head, and the outputs of both sample and hold circuits are connected with quotient or ratio forming means for forming the quotient or ratio of the maximum value and mininum value as the characterizing feature, for each interval between two clock markings. By a quotient or ratio forming means of this kind the influence of the measuring device on the accuracy of the measurement result will be substantially eliminated.

For reasons of confidence and personal integrity, in some cases, it may not be allowed to provide identity papers and other documents with coded signs which may not be recognized by their owner. In order to be able to protect data supports not having a magnetic track or another kind or record track against imitation, in accordance with the inventive method, the third reading head may be a sign reading device, a respective register being provided for the characterizing data read by the third reading head and a respective register for the characterizing features derived from the first reading head being provided, and one of these registers is connected with the redistribution means for modifying the succession of the input data in accordance with a predetermined re-arrangement rule. In this case, the characterizing data are also recorded on the data support in readable shape, e.g. in the form of numbers or letters, and are identified by the sign reading device. In order to prevent that it may easily be recognized which of the characterizing data are associated with specific measuring points, the characterizing data may be recorded in a different succession from the succession in which the characterizing features are detected upon reading of the data support. The rearrangement means are used to put the characterizing data within the identification device into the correct succession.

However, in those cases where a magnetic track or a similar record track may be provided on the data support, this may be used as a protocol track and may contain the respective positional information for the individual characterizing data, in addition to the characterizing data. In this case, a third reading head may be provided which is connected with position selecting means and with characterizing data selecting means. Both selecting means separate the recorded positional data and the characterizing data from each other so that both data may be separately processed or/and analysed.

DESCRIPTION OF PREFERRED EMBODIMENTS

Figure 1:
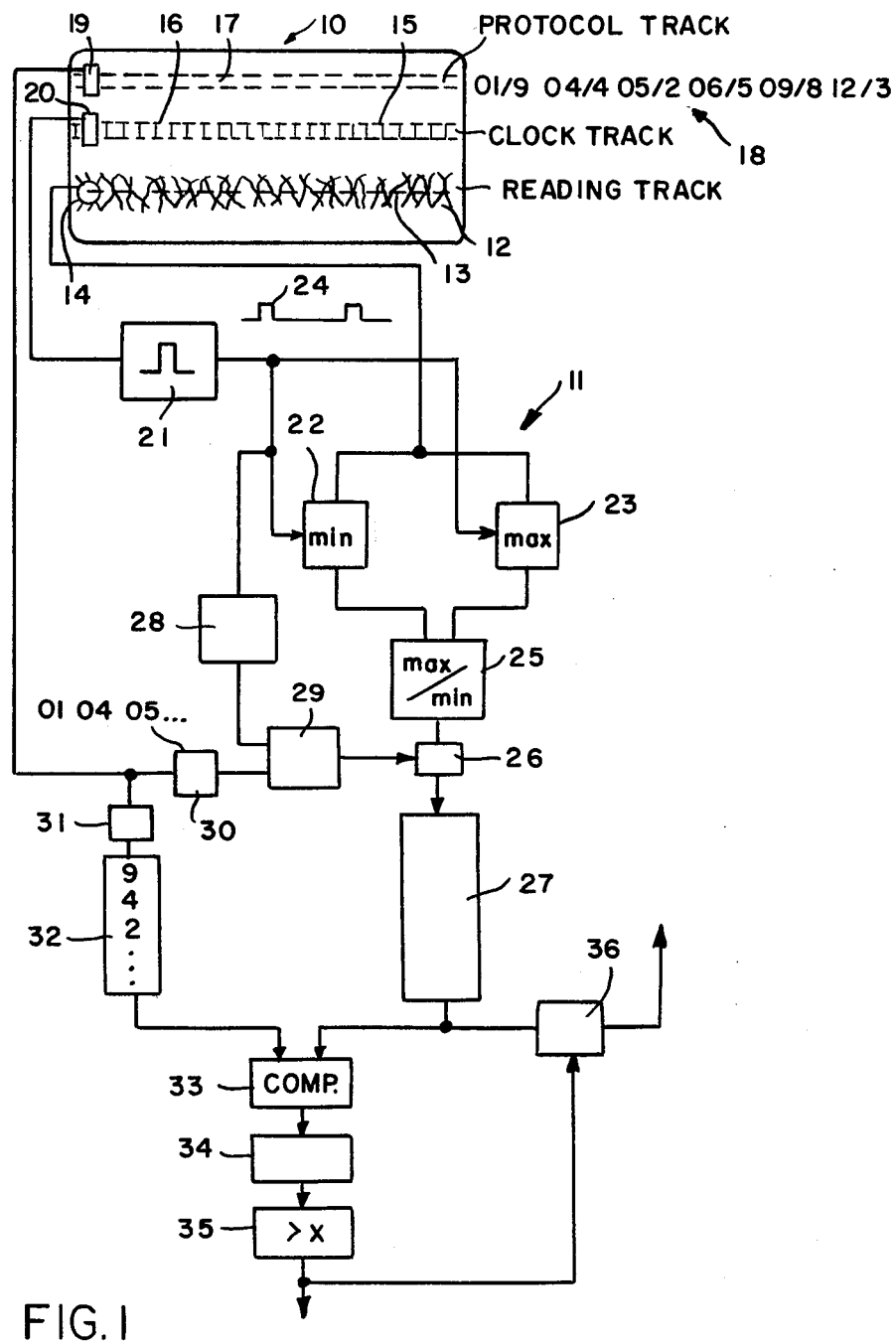
Figure 2:
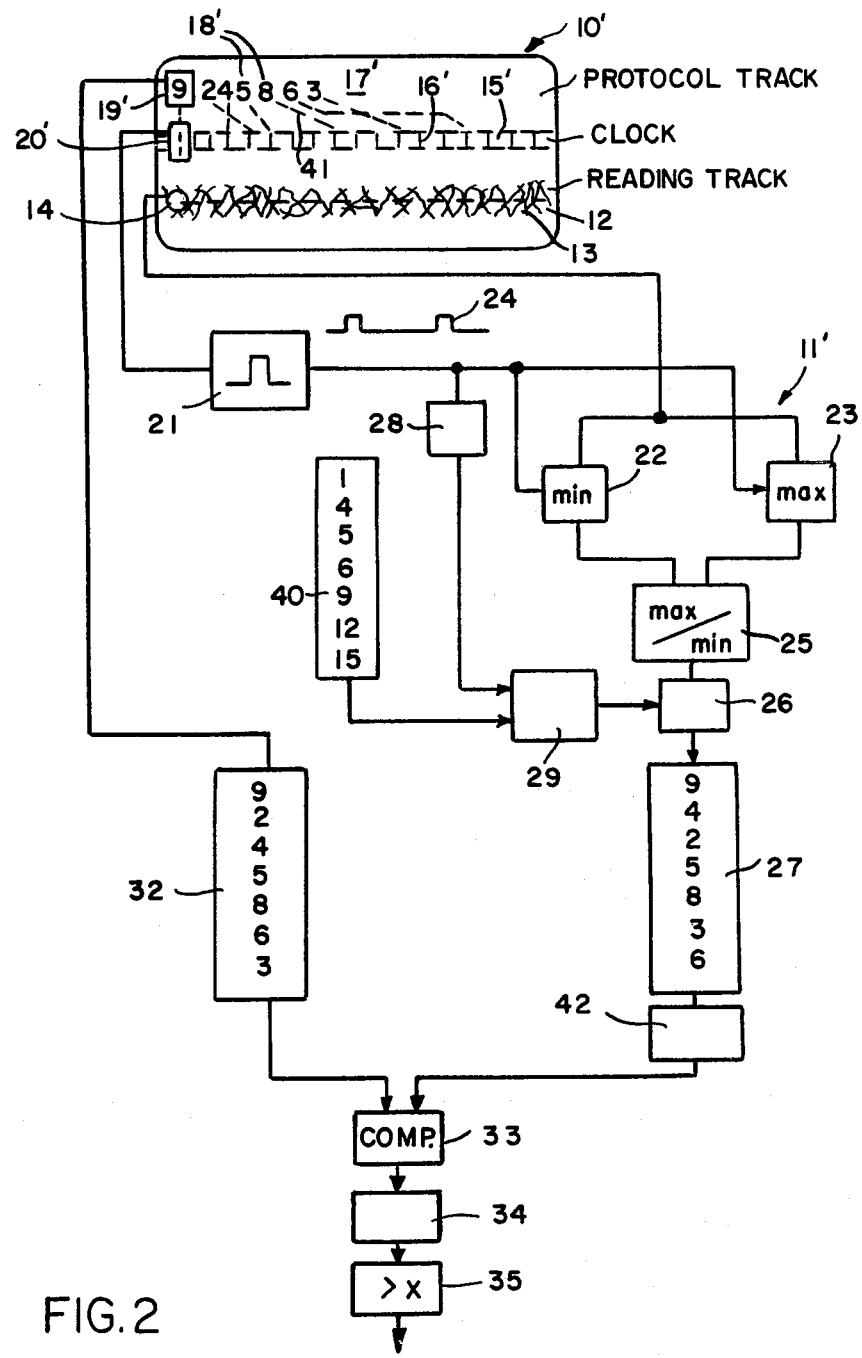
Figure 1:
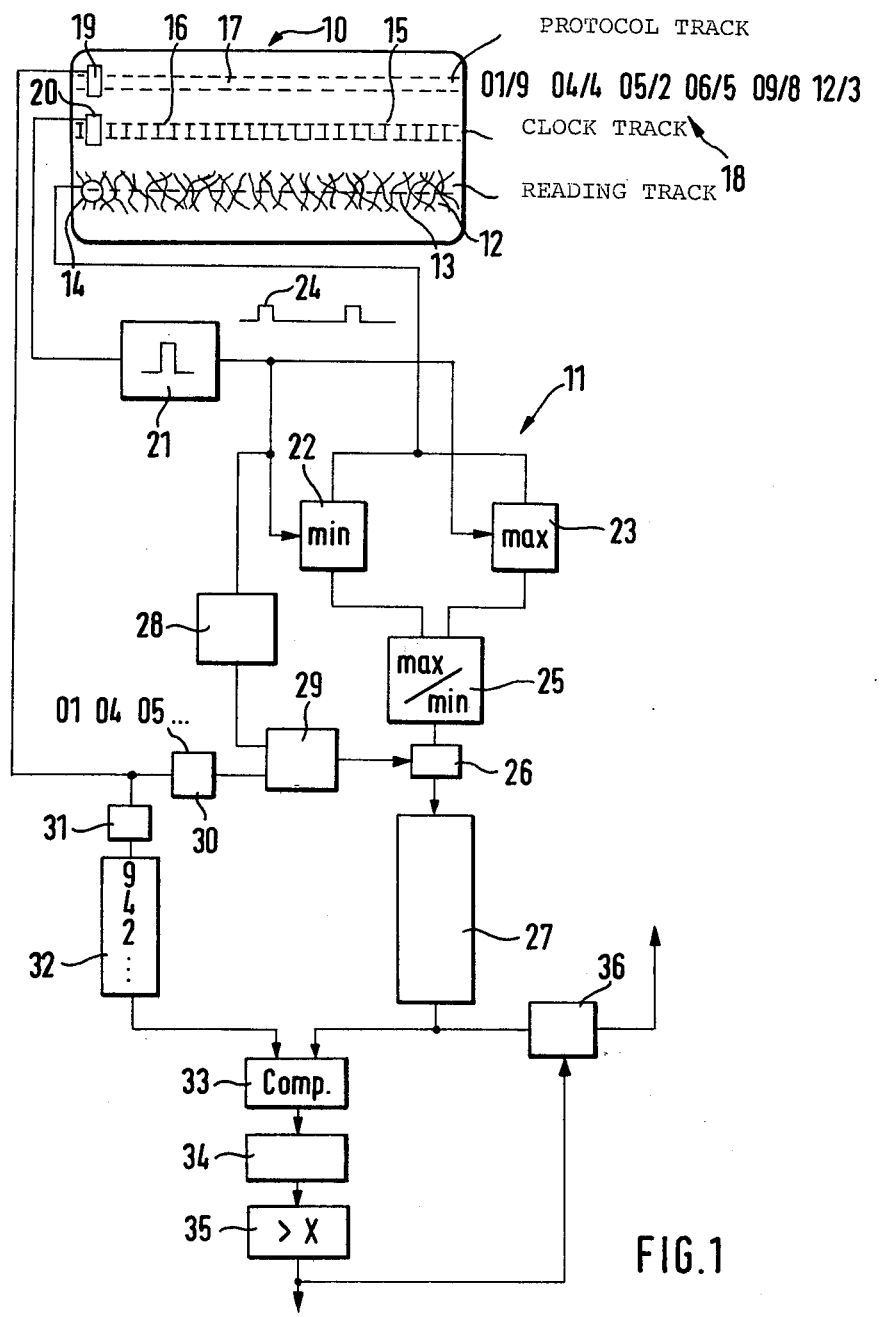
Figure 2:
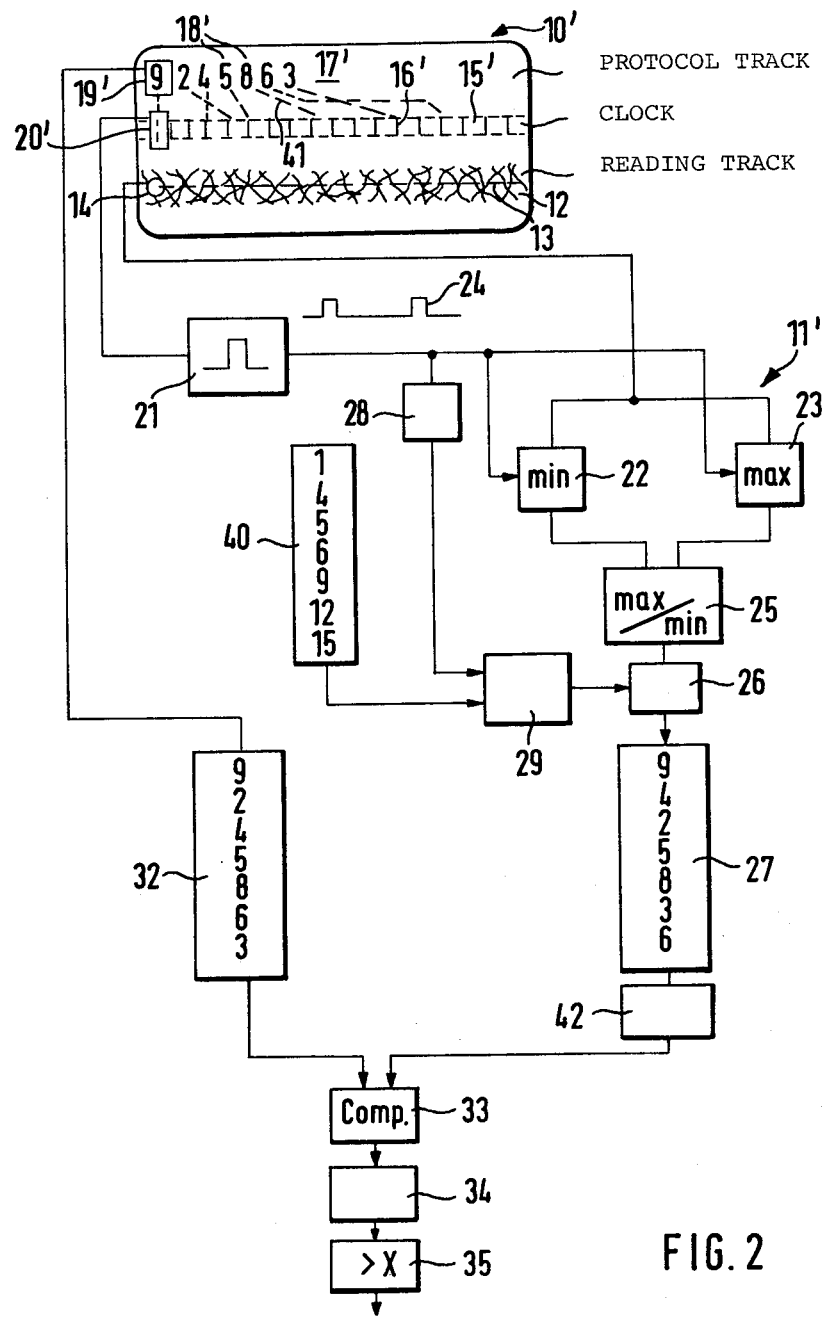

Further objects and features of the invention will stand out from the following non-limitative description of exemplary embodiments of the invention with reference to the drawings in which:

FIG. 1 shows a diagrammatic block circuit of a first embodiment of the method in which the card has a magnetic track used as a protocol track; and FIG. 2 is a block diagram of a second embodiment in which the card is provided with a printed protocol track bearing readable writing signs.

In the examplary embodiment of FIG. 1, a card, for example a check card or an identity card, is designated by 10. On the card 10, only those portions are shown which are relevant with respect to the characterizing system. Other imprints and reading tracks are not shown. The card 10 consists of a strong material keeping its shape, for example a laminated material of paper and plastics, or completely of plastics. It is provided with an imprint which is not entirely shown in the present case. Only part of a background pattern or design is shown in form of a surface pattern 12 imprinted on the card. The surface pattern 12 consists of many lines and dashes of regular or arbitrary form and which are superimposed. Preferably, the lines are of different colors, the individual color components being applied by separate printing operations. The reading track 13 extends through the surface pattern 12, the reading track, however, being not visible within the imprinted design of the card. The reading track 13 is an imaginary straight line or narrow strip extending in lengthwise direction of the card. Within an identification device, a first reading head 14 is situated over the reading track 13.

The reading head 14 is provided with a light source directed towards the card 10 and with a light receiver which is also directed towards the card 10 and which receives the light reflected by the card from a point zone of minimum dimensions, to convert the same into an electric signal.

A magnetic clock track 15 extends parallel to the reading track 13 and is provided with magnetic clock markings 16 indicating the positions of the reading track 13 to be detected.

A magnetic protocol track 17 extends parallel to both tracks 13 and 17 and is recorded with the characterizing data of the positions to be analysed. FIG. 1 shows an example of the characterizing data recorded on the protocol track 17. In this example, the characterizing value of the reading position 01 is 9. The characterizing value of the reading position 04 is 4, the characterizing value of the reading position 05 is 2 etc. These characterizing data 18 recorded in binary code on the protocol track represent the measurement results which are obtained upon reading and analysing the reading track 13 in the appropriate manner. The characterizing data 18 are read by a magnetic reading head 19 which may be moved along the protocol track 17. A further reading head 20 may be moved along the clock track 15. The magnetic clock markings 16 generate clock signals therein. The reading heads 14, 19 and 20 are moved in synchronism and parallel with each other in lengthwise direction of the card 10.

The reading head 20 is connected with a pulse shaper 21 at the output of which respective pulses of predetermined duration are provided when the reading head 20 passes any of the clock markings 16. The output signal of the pulse shaper 21 controls a minimum value holding circuit 22 and a maximum value holding circuit 23. The inputs of the holding circuits 22 and 23 are supplied with the signal of the reading head 14. When the reading head 14 is moved along the reading track 13, an analysis of one reading position on the reading track 13 is performed during the duration of each clock pulse 24 appearing at the output of the pulse shaper 21. The minimum value holding circuit 22 stores the minimum signal encountered during one pulse 24 at the reading path following the respective clock marking 16, and the maximum value holding circuit 23 stores the maximum signal encountered during the duration of the clock pulse 24 at the reading head 14, representing the brightest point of the detected zone.

The output of the minimum and maximum value holding circuits 22 and 23 are connected with the inputs of a quotient or ratio former 25 forming the characterizing value of the respective reading zone. The characterizing value consists of the quotient of the maximum to the minimum value. The output of the quotient former 25 is connected with the input of the register 27 through a gate circuit 26. The measured characterizing values of the reading zones indicated by the clock markings 16 are introduced into the register 27.

In the present case, not all of the reading positions of the reading track 13 are analysed, but only those reading positions the characterizing data 18 of which are stored on the protocol track 17. In the present example, these are the positions 01, 04, 05, 06, 09, 12, etc.

The number of the pulses 21 delivered by the pulse shaper 21 are counted by a counter 28. The output of counter 28 is connected with the input of a comparator 29 the other input of which is connected with the output of a position selector 30. The position selector 30 is connected with the reading head 19 reading the protocol track 17. From the characterizing data 18, it selects the indications with respect to the positions to be analysed (01, 04, 05, . . . ). When the count of the counter 28 corresponds with the number of a position to be analysed, the comparator 29 delivers a control pulse to the gate circuit 26 which is then switched through to introduce the respective output signal of the quotient former 25 into the register 27. In this manner, only the measured characterizing values of those positions are introduced into the register 27 the characterizing data of which are recorded on the protocol track 17.

A characterizing data selector 31 is further connected with the reading head 19 to separate the characterizing data (9, 4, 2, 5, 8, 3, . . . ) from the position indications (01, 04, 05, 06, 09, 12, . . . ) and introduce only the characterizing data into a register 32.

At the end of the analysis of the card 10, the characterizing values of the reading track 13 contained within the register 27 must correspond with the characterizing data contained within register 32 and read from the protocol track 17. Coincidence is checked by comparator 33 to which the outputs of registers 27 and 32 are supplied. The output of comparator 33 is connected with a counter 34 which increments by one count upon each detection of coincidence. The output of counter 34 is connected with a digital threshold circuit 35 delivering an output signal in case the number of coincidences between the measured characterizing values and the recorded characterizing data exceeds a predetermined number x during analysis of a card 10. The number x is smaller than the number of the measurement positions to be analysed, so that a certain number of deviations is tolerated.

After each analysis operation, the values output from register 27 which correspond to the actually measured values on the reading track 13, are recorded on the protocol track 17 in case the card was recognized as being authentic. When a signal appears at the output of the threshold circuit 35, a gate circuit 36 is opened to supply the content of register 27 to a reading head (not shown) provided above the protocol track 17. The reading head erases the previous content of the protocol track 17 and records the content of register 27 on the protocol track. In this manner, contrast variations of the surface design 12 due to aging are taken into account on the protocol track 17.

In the embodiment of FIG. 2, the card 10' has no magnetic track. The protocol track 17' contains imprinted letters 18' forming the characterizing data. The clock track 15' is provided with optically readable clock markings 16' which are scanned by an optic reading device 20'.

In this case, too, the identification device 11 is provided with a minimum value holding circuit 22 and a maximum value holding circuit 23 the inputs of which are supplied with the signals of reading head 14. Clock control of the holding circuits 22 and 23 is achieved in the same manner as with the previous embodiment, by pulse shaper 21. The outputs of the holding circuits 22 and 23 are connected with the quotient former 25 which is connected with register 27 through the gate circuit 26.

The counter 28 will count the pulses delivered by the pulse generator 21, and its count is applied to one input of the comparator 29. The other input of the comparator 29 is connected with a position memory 40 which, in this case, contains the position numbers 1, 4, 5, 6, 9, 12, 15, . . . These are the numbers of the clock markings 16' the respective positions of which are analysed on the reading track 13. When any of such reading positions is reached, the comparator 29 will open the gate circuit 26 to introduce the characterizing value measured at this reading position into the register 27.

The protocol track 17' contains the characterizing data of the positions to be analysed in form of numbers 18'. However, the characterizing data are not indicated in the correct succession, but rather in interchanged form. FIG. 2 indicates by dashes 41 which characterizing data correspond with which dash markings 16. The characterizing data 18' are read by sign reader 19' and stored in a register 32. Upon appropriate detection of the characterizing values on the reading track 13, the characterizing values within register 27 will have a different succession from the succession within register 32, due to the interchanging operation. Therefore, register 27 is connected with redistribution means 42 performing a distribution of the characterizing values, i.e. a modification of the succession thereof. The redistribution means 42 are connected with the input of the comparator 33 the other input of which is supplied with the output of the register 32. The counter 34 counts the number of positions on which coincidence between the measured characterizing values and the read characterizing data is determined. In case this number exceeds the preadjusted number x, the threshold circuit 35 will deliver an output signal indicating an authentic card 10'.

In the embodiment of FIG. 2, the measurement protocol contained on the protocol track 17' will remain constant as the characterizing data on the protocol track 17' cannot be erased.

We claim:

1. A system for authenticating and updating a data support, providing protection against falsification, imitation, or duplication thereof, the data support comprising an area with a random uncoded pattern to be read, data storage means having prerecorded data stored therein corresponding to measurement data representative of a physical property of said area to be read, and a correspondence track having means to indicate which portions of the area are to be measured when the data support is compared with the prerecorded data in said data storage means, said system comprising first means for measuring a physical property of the data support, second means for comparing said measured physical property with the prerecorded data corresponding to the physical property of said data support to determine if the data support is authentic, and third means for recording in said data storage means the measured physical property in place of the prerecorded physical property stored by said data storage means in the event said data support is recognized as authentic, whereby if in sequental use of the data support the measured physical property is related to the previous recorded physical property within acceptable limits, the updating of the measured property will allow the further use of an authentic data support as the authentic data support ages.

2. The system according to claim 1 in which said first means comprises means for directing light against said area with said random uncoded pattern and means for measuring the effect of said area on said directed light.

3. A system for authenticating and updating a data support providing protection against falsification, imitation, or duplication thereof, the data support comprising an area with a random uncoded pattern to be read, data storage means having prerecorded data stored therein corresponding to measurement data representative of a physical property of said area to be read, said system comprising first means for measuring a physical property of the area with the random uncoded pattern, second means for comparing said measured physical property with the prerecorded data corresponding to the physical property of said area with the random uncoded pattern to determine if the data support is authentic, and third means for recording in said data storage means the measured physical property in place of the prerecorded physical property stored by said data storage means in the event said data support is recognized as authentic, whereby if in sequental use of the data support the measured physical property is related to the previous recorded physical property within acceptable limits, the updating of the measured property will allow the further use of an authentic data support as the authentic data support ages.

4. The system of claim 3 in which the physical property of a plurality of desrete points of said area with said random uncoded pattern are measured and compared with the prerecorded data in said data storage means.

* * * * *